Patented Mar. 30, 1948

2,438,552

UNITED STATES PATENT OFFICE 2,438,552

CAST REFRACTORY PRODUCT

Theodore E. Field, Louisville, Ky., assignor to Corhart Refractories Company, Louisville, Ky., a corporation of Delaware No Drawing. Application October 14, 1940, Serial No. 361,187

1 Claim. (Cl. 106—57)

In my other application, Serial Number 300,480, Patent No. 2,271,366, January 27, 1942, it was pointed out that melted and cast refractories consisting of zirconia and corundum crystals in a matrix of uncrystallized glass were especially resistant to corrosion by molten glass. In early attempts to manufacture such refractories from commercial materials however, no castings free from cracks could be obtained despite careful annealing in insulating powder.

To manufacture zirconia-corundum-glass refractories of the desired type, the usual raw materials commercially available are bauxite, zirkite and zircon, specimen analyses of which are given in the following table.

can yield, without rupture, to accommodate the strains produced by cooling, until the time that the glass phase itself becomes too viscous to permit plastic deformation. It then depends upon the physical properties of this glass phase as to whether the further strains are sufficient to produce cracking.

At any rate I have found that cracking can be prevented by altering the chemical composition, and therefore the physical properties, of the glass phase alone. This can be done either by adding small amounts of other ingredients or by selecting possible major ingredients in such a way as to bring about the desired final composition.

Two additions whose effects are quite powerful

Table I

| Material | $ZrO_2$ | $SiO_2$ | $Al_2O_3$ | $Fe_2O_3$ | $TiO_2$ | CaO | MgO | $K_2O$ | $Na_2O$ |
|---|---|---|---|---|---|---|---|---|---|
| Zirkite | 76.7 | 18.81 | 2.2 | .70 | 1.06 | .26 | .05 | .12 | .13 |
| Do | 76.2 | 12.51 | 4.8 | 4.39 | 1.50 | .26 | .04 | .18 | .09 |
| Do | 84.1 | 4.62 | 2.1 | 7.06 | 1.57 | .24 | .10 | .11 | .09 |
| Zircon | 64.0 | 35.00 | 0.4 | .01 | .30 | .20 | .10 | .00 | .02 |
| Do | 63.3 | 29.12 | 4.2 | .52 | 2.55 | .22 | .08 | .00 | .00 |
| Do | 56.8 | 33.64 | 4.2 | .32 | 4.59 | .37 | .07 | | .02 |
| Bauxite | 0.0 | 5.40 | 90.0 | 2.12 | 2.20 | .13 | .10 | .00 | .00 |
| Do | 0.0 | 6.46 | 88.1 | 2.45 | 2.51 | .07 | .10 | .25 | .06 |
| Do | 0.0 | 8.05 | 87.4 | 2.28 | 1.97 | .13 | .07 | .07 | .06 |

It is seen that in the natural materials both the alkali and the alkaline earth are present in only small quantities. Since these do not crystallize out, however, they are all concentrated into the glass phase which further contains all the silica; saturation amounts of $Al_2O_3$ and $ZrO_2$; and also iron oxide and $TiO_2$ which may or may not reach their saturation values.

I have discovered that the cracking of commercial baddeleyite-corundum-glass refractories unin this respect are soda and dolomite. Another important variable is iron oxide, but control in this case would normally be exercised by judicious selection of the major raw materials since iron oxide is present in significant but variable quantities in all three.

The effect of alkali on cracking is illustrated by the following composition in which soda was added to the normal commercial materials, and castings 4" x 12" x 18" were made.

Table II

| Melt | $ZrO_2$ | $SiO_2$ | $Al_2O_3$ | $Fe_2O_3$ | $TiO_2$ | CaO | MgO | $K_2O$ | $Na_2O$ | Alk | Blocks Cracked |
|---|---|---|---|---|---|---|---|---|---|---|---|
| | | | | | | | | | | | Per cent |
| A | 19.8 | 9.66 | 67.3 | 1.38 | 1.49 | .16 | .08 | .05 | .09 | .14 | 100 |
| B | 21.5 | 10.60 | 64.0 | 1.51 | 1.79 | .15 | .04 | .11 | .31 | .42 | 100 |
| C | 23.5 | 11.14 | 61.2 | 1.58 | 1.78 | .16 | .05 | .12 | .48 | .60 | 0 |
| D | 20.1 | 9.80 | 66.2 | 1.29 | 1.56 | .17 | .06 | .18 | .66 | .84 | 0 |
| E | 20.1 | 10.63 | 65.1 | 1.60 | 1.45 | .17 | .06 | .10 | .81 | .91 | 0 | der the usual manufacturing conditions is primarily a function of the properties of the glass phase and is not importantly dependent upon the relative proportions of the two primary crystal phases, or even upon the amount of the glass phase present. This surprising result probably indicates that the crystal network first formed, In this system, a sharp lower limit of 0.6% alkali exists for good recovery of this size casting under usual manufacturing conditions. Other melts have shown that an even greater excess of soda can be used and in fact is required for larger sizes of castings. I have found for example that 1.3 to 1.4% $Na_2O$ must be added to insure the recovery of heavy throat covers for glass furnaces. This excess $Na_2O$ is not harmful however for the recovery of the smaller blocks. Unfortunately the resistance to corrosion by glass As stated above, I have also found the $Fe_2O_3$ content in the casting an important variable and this is illustrated by the cracking of the following compositions.

*Table V*

| Melt | $ZrO_2$ | $SiO_2$ | $Al_2O_3$ | $Fe_2O_3$ | $TiO_2$ | CaO | MgO | $K_2O$ | $Na_2O$ | $R_2O$ | Blocks Cracked |
|---|---|---|---|---|---|---|---|---|---|---|---|
| | | | | | | | | | | | Per cent |
| N | 14.5 | 10.56 | 71.0 | .84 | 2.22 | .08 | .06 | .12 | .64 | .76 | 100 |
| O | 14.7 | 11.88 | 69.9 | .35 | 2.12 | .08 | .06 | .13 | .80 | .93 | 0 |
| P | 15.1 | 10.96 | 69.3 | 1.81 | 2.05 | .13 | .09 | .09 | .43 | .52 | 62 |
| Q | 15.1 | 11.79 | 68.0 | 2.06 | 2.16 | .13 | .10 | .14 | .47 | .61 | 0 |

| Melt | $ZrO_2$ | $SiO_2$ | $Al_2O_3$ | $Fe_2O_3$ | $TiO_2$ | CaO | MgO | RO | $K_2O$ | $Na_2O$ | Blocks Cracked |
|---|---|---|---|---|---|---|---|---|---|---|---|
| | | | | | | | | | | | Per cent |
| R | 14.2 | 10.32 | 70.0 | .51 | 2.54 | 1.41 | .99 | 1.40 | .04 | .00 | 75 |
| S | 14.2 | 10.52 | 69.6 | .50 | 2.53 | 1.58 | 1.07 | 2.65 | .00 | .00 | 0 |
| T | 15.1 | 10.97 | 67.9 | 1.55 | 2.36 | 1.30 | .66 | 1.96 | .12 | .00 | 88 |
| U | 15.1 | 11.07 | 67.3 | 2.06 | 2.35 | 1.28 | .80 | 2.08 | .06 | .00 | 0 | is significantly lowered as soda is increased, so that soda must be kept as low as is consistent with good recovery of the product.

In the same way, the following compositions illustrate the effect of alkaline earth additions (dolomite), also on 4" x 12" x 18" castings.

In this system it is observed that increasing the $Fe_2O_3$ by 1.5% in the casting, drops the minimum alkali limit for good recovery by 0.3% (30% of its glass phase concentration) and drops the minimum alkaline earth limit by 0.6%.

*Table III*

| Melt | $ZrO_2$ | $SiO_2$ | $Al_2O_3$ | $Fe_2O_3$ | $TiO_2$ | CaO | MgO | RO | $K_2O$ | $Na_2O$ | Blocks Cracked |
|---|---|---|---|---|---|---|---|---|---|---|---|
| | | | | | | | | | | | Per cent |
| F | 19.8 | 9.66 | 67.3 | 1.38 | 1.49 | .16 | .08 | .24 | .05 | .09 | 100 |
| G | 22.9 | 9.75 | 63.2 | 1.28 | 1.74 | .79 | .17 | .96 | .09 | .07 | 38 |
| H | 22.2 | 9.75 | 63.3 | 1.42 | 1.71 | 1.05 | .40 | 1.45 | .12 | .00 | 0 |
| I | 21.1 | 10.12 | 62.3 | 1.69 | 1.66 | 1.80 | 1.15 | 2.95 | .14 | .00 | 0 |

In this system a lower limit for good recovery exists at 1.45% alkaline earth.

When both alkali and alkaline earth (lime) are added, intermediate limits exist as illustrated by the following compositions.

From the standpoint of corrosion by glass however, the higher iron oxide is even more harmful than the alkali or alkaline earth otherwise required. I normally prefer therefore to limit

*Table IV*

| Melt | $ZrO_2$ | $SiO_2$ | $Al_2O_3$ | $Fe_2O_3$ | TiO | CaO | MgO | RO | $K_2O$ | $Na_2O$ | $R_2O$ | Blocks Cracked |
|---|---|---|---|---|---|---|---|---|---|---|---|---|
| | | | | | | | | | | | | Per cent |
| J | 22.1 | 9.56 | 65.0 | .78 | 1.75 | .57 | .00 | .57 | .10 | .18 | .28 | 25 |
| K | 22.3 | 9.42 | 64.5 | 1.02 | 1.75 | .54 | .00 | .54 | .11 | .35 | .46 | 0 |
| L | 22.9 | 9.75 | 63.2 | 1.28 | 1.74 | .79 | .17 | .96 | .09 | .07 | .16 | 38 |
| M | 22.5 | 11.08 | 61.7 | 1.51 | 1.77 | 1.14 | .00 | 1.14 | .09 | .20 | .29 | 0 |

This gives a lower limit of 0.46% alkali when alkaline earth is 0.54%, and only 0.29% when alkaline earth is 1.14%. All four of these limits are consistent with the statement: good recovery of 4 x 12 x 18's is obtained in the above general system when the sum of the alkali and 38% of the alkaline earth is greater than 0.66%. Resistance to corrosion by glass is greater for the alkali than for the alkaline earth compositions so I normally prefer to keep the alkaline earth low when the block is intended for flux block use. For use in superstructure or for other purposes out of contact with glass, dolomite can, however, be advantageously used alone or in combination with alkali, since it is a far cheaper addition than $Na_2O$ (added as soda ash) and also does not give trouble by volatilization.

the iron oxide to that obtained incidentally from the major ingredients, and to adjust the alkali or alkaline earth accordingly.

According to my invention therefore, I obtain refractory castings which are both resistant to corrosion by molten glass and recoverable free from cracks. This is done by sacrificing a minimum amount of the resistance to corrosion, in order to include fluxes properly adjusted to give castings free from cracks. For each system of major constituents, i. e., $ZrO_2$, $Al_2O_3$ and silica, I determine and then use the minimum alkali or alkaline earth, in reference to the $Fe_2O_3$ content, which will give good recovery of the various sizes of castings desired. Compositions which I have found to be both resistant and easily recovered free from cracks are illustrated in Table VI.

Table VI

| Melt | ZrO$_2$ | SiO$_2$ | Al$_2$O$_3$ | Fe$_2$O$_3$ | TiO$_2$ | CaO | MgO | K$_2$O | Na$_2$O |
|---|---|---|---|---|---|---|---|---|---|
| V | 21.4 | 11.04 | 63.0 | 1.30 | 1.55 | .46 | .27 | .28 | .69 |
| W | 20.4 | 10.30 | 63.9 | 1.63 | 1.95 | .48 | .28 | .05 | 1.04 |
| X | 19.9 | 10.25 | 65.4 | 1.20 | 1.69 | .18 | .10 | .13 | 1.18 |
| Y | 20.1 | 10.09 | 65.3 | 1.00 | 1.80 | .17 | .07 | .08 | 1.40 |
| Z | 40.0 | 11.07 | 45.9 | .43 | .72 | .14 | .02 | .08 | 1.65 |
| A—A | 40.0 | 11.04 | 45.3 | .60 | .72 | .14 | .02 | .08 | 2.13 |

What I claim as new and desire to secure by U. S. Letters Patent is:

A heat cast refractory consisting essentially of baddeleyite, corundum and a siliceous glass, in which the silica lies between 9 and 12%, the iron oxide between 0.4 and 1.7%, the sodium oxide between 1.0 and 2.2% and the sum of MgO and CaO between 0.2 and 0.8% by weight by chemical analysis.

THEODORE E. FIELD.

REFERENCES CITED

The following references are of record in the file of this patent:

UNITED STATES PATENTS

| Number | Name | Date |
|---|---|---|
| 1,615,751 | Fulcher | Jan. 25, 1927 |
| 1,682,251 | Riddle | Aug. 28, 1928 |
| 2,271,366 | Field | Jan. 27, 1942 |
| 2,271,367 | Fulcher et al. | Jan. 27, 1942 |

FOREIGN PATENTS

| Number | Country | Date |
|---|---|---|
| 800,779 | France | 1936 |